United States Patent [19]

Dawson et al.

[11] 3,904,814

[45] Sept. 9, 1975

[54] FLUID-PRESSURE OPERATED SPLICE FOR ELECTRICALLY CONDUCTIVE GABLES

[75] Inventors: Robert H. Dawson, Lake Bluff; James L. McGrath, Medina, both of Ill.

[73] Assignee: Reliable Electric Company, Franklin Park, Ill.

[22] Filed: Mar. 15, 1974

[21] Appl. No.: 451,492

[52] U.S. Cl............ 174/84 R; 174/94 R; 24/136 R; 403/74; 339/273 R
[51] Int. Cl.².................................... H02G 15/08
[58] Field of Search......... 174/84 R, 84 S, 88 S, 90, 174/94 R, 94 S, 84 C; 339/273 S, 273 R, 117 R, 117 P; 403/15, 31, 74; 24/115 M, 136 R, 263 DA, 263 DG

[56] References Cited
UNITED STATES PATENTS 2,158,892   5/1939   Becker, Sr. et al.......... 174/84 S UX 3,515,794   6/1970   Beinhaur et al.............. 174/94 R X

FOREIGN PATENTS OR APPLICATIONS 815,044   6/1959   United Kingdom.............. 174/84 C

*Primary Examiner*—Darrell L. Clay
*Attorney, Agent, or Firm*—Olsen, Trexler, Wolters, Bushnell & Fosse, Ltd.

[57] ABSTRACT

A cable splice comprises a casing with a tapered bore portion and a tapered jaw cluster therein for gripping the cable. The jaws of the jaw cluster engage a piston that is slidable in a cylindrical bore portion of the casing and also has a central cavity to receive the cable when the latter is installed in the splice. Hydraulic fluid may be introduced into the casing to bias the piston in a direction to cause the jaws to bite into and permanently grip the cable, after which the fluid is withdrawn from the casing.

3 Claims, 5 Drawing Figures

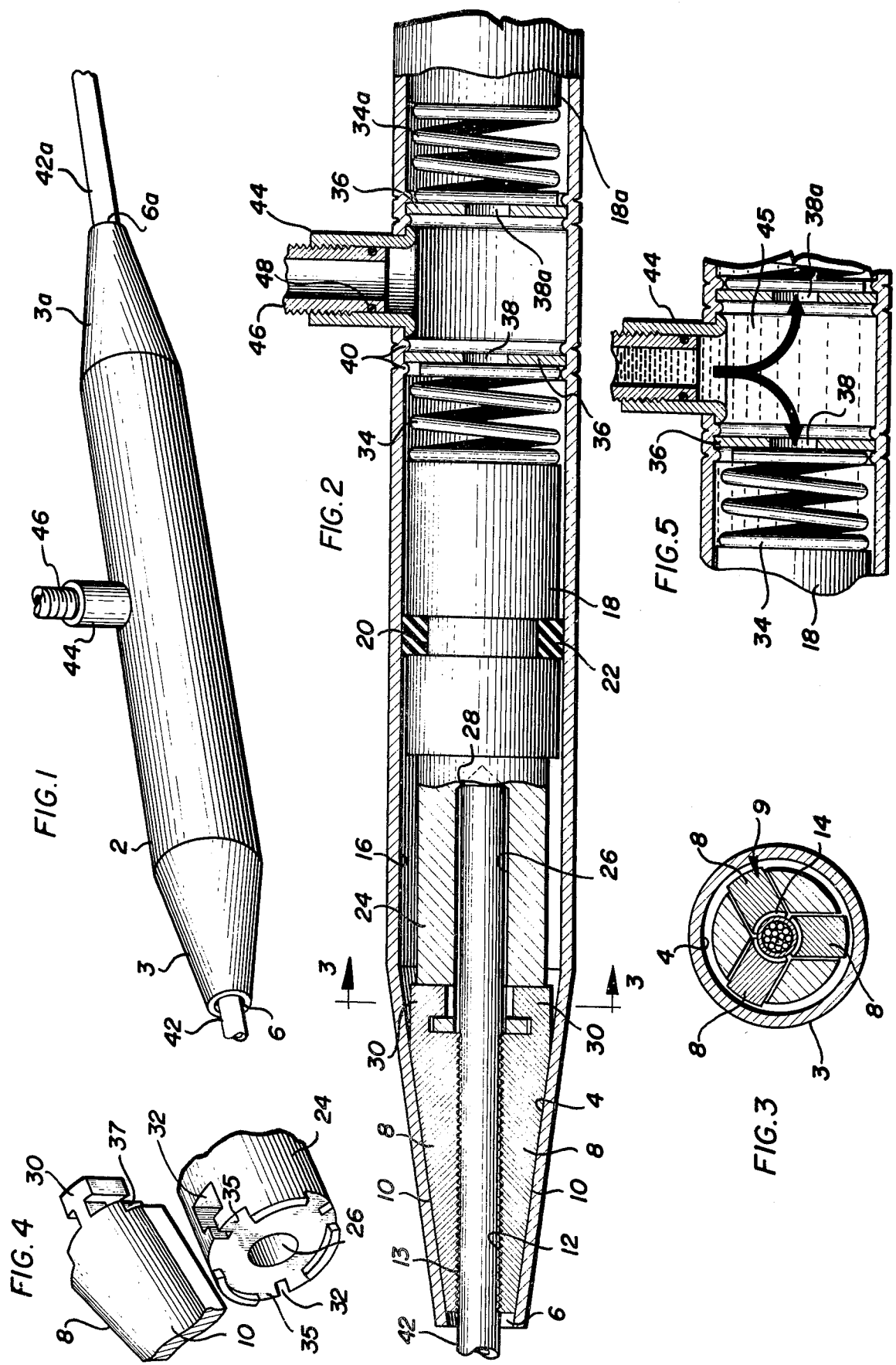

FLUID-PRESSURE OPERATED SPLICE FOR ELECTRICALLY CONDUCTIVE CABLES

BACKGROUND OF THE INVENTION

This invention relates to improvements in splices for electrical cables and the like.

The cable splice with which the present invention is concerned is of a general type that includes a casing with opposed bore portions for receiving gripping members or jaws that grip the ends of the cables that are to be spliced. Splices of this type are designed so that there is a cluster of jaws at opposite ends of the casing to form an in-line connection for the cables. In a typical arrangement the jaws are spring-biased toward their closed positions so as to hold the respective jaw clusters assembled within the casing. When a cable is introduced into the casing, the spring yields to open up the jaws so as to receive the end of the cable. The jaws contain teeth which grip the cable when tension is applied to the cable. Where the cable is of the overhead type, the weight of the cable is usually sufficient to exert the requisite amount of tension to pull the jaws into biting engagement with the cable.

There are, however, numerous installations wherein the cable is to be installed underground. Under such conditions the weight of the cable cannot be used as a source of tension to set the jaws. It should be noted that the spring within the splice does not apply sufficient force to the jaws to cause them to bite effectively into the cable. The reason that the spring will not perform this function lies in the fact that if the spring were sufficiently powerful to do this it would be impossible to insert the cable within the jaws by manual means.

For the foregoing reasons splices of the foregoing type have generally not been used for splicing underground cables. One exception to this has been a splice in which the jaws are explosively actuated into gripping engagement with the cable. Such a splice may be of the type shown, for example, in U.S. Pat. to Beinhauer et al. No. 3,515,794.

OBJECTS AND SUMMARY OF THE INVENTION

An object of this invention is to provide a splice for joining electrical cables and which includes a casing with jaws therein for gripping the cables, and wherein the jaws are urged into biting engagement with the cables by pistons upon which fluid pressure (hydraulic or pneumatic) is applied.

A further object of this invention is to provide a splice of the type stated which avoids the need for explosives and is, therefore, relatively safe to handle.

A still further object of this invention is to provide a splice of the type stated in which the force applied to the jaws can be controlled by the workmen splicing the cable.

Yet another object of this invention is to provide a splice of the type stated which is easily used in splicing cables which are intended to be laid underground.

In accordance with the foregoing objects the fluid-pressure operated splice comprises a casing having a bore with a conical bore portion terminating at its smaller diameter end in a cable-receiving opening. A plurality of jaws are mounted in the conical bore portion with each jaw being axially tapered in the direction of the cable-receiving opening. The jaws are circumferentially disposed to provide a generally tubular jaw-cluster, the jaws having recesses that cooperate to form a jaw-cluster bore coaxial with the casing bore and with the recesses having teeth exposed to the jaw-cluster bore. The casing bore has a cylindrical bore portion adjacent to the larger diameter end of the conical bore portion, and a piston is slidable in the cylindrical bore portion. The jaws are joined to the piston, and the piston has a central cavity communicating with the jaw-cluster bore for receiving a cable inserted through the cable receiving opening and through the jaw-cluster bore. Spring means are provided in the casing to impose a pre-load on the jaws in the direction of the cable-receiving opening. This pre-load is insufficient for effective gripping of the cable. However, the casing has means for receiving fluid under pressure in the cylindrical bore portion thereof to impose fluid pressure on the piston in the direction of the cable-receiving opening sufficient so that the pressure on the piston urges the teeth of the jaw-cluster into biting engagement with cable. The area of the piston acted upon by the fluid pressure and the tapers of the casing and the jaws are such that the jaws remain in gripping engagement with the cable upon release of the fluid pressure.

BRIEF DESCRIPTION OF THE FIGURES

FIG. 1 is a perspective view of a cable splice constructed in accordance with and embodying the present invention;

FIG. 2 is a fragmentary elevational view, partially broken away and in section and on an enlarged scale, of the splice shown in FIG. 1;

FIG. 3 is a sectional view taken along line 3—3 of FIG. 2;

FIG. 4 is a fragmentary perspective view showing the interfitting structure of the piston and the jaws; and FIG. 5 is a fragmentary view of a portion of FIG. 4 but showing the same with hydraulic fluid having been introduced into the casing.

DETAILED DESCRIPTION

Referring now in more detail to the drawing, which illustrates a preferred embodiment of the present invention, there is shown a splice that comprises a tubular metallic casing 2 having identical tapered opposite ends 3, 3a. The tapered end 3 defines a conical bore portion 4 that terminates at its smaller diameter end in a cable-receiving opening 6.

Disposed within the conical bore portion 4 are jaws 8 that are circumferentially disposed to form a jaw-cluster 9. In the present form of the invention there are three jaws 8 although the invention is not limited to a three jaw cluster. Each jaw 8 has an external surface 10 which is conically tapered toward the opening 6. The tapers on the surfaces 10 conform approximately to the taper of the bore portion 4. Each jaw 8 has a recess 12 with teeth 13 being at each such recess 12. The recesses 12 cooperate to form a jaw-cluster bore 14 that is substantially coaxial with the bore of the casing 2.

At the larger diameter end of the conical bore portion 4 the casing has a cylindrical bore portion 16. This bore portion 16 joins the two opposite conical bore portions 3, 3a. Slidably mounted within the cylindrical bore portion 16 is a piston 18 that is formed of a suitable plastic material, such as nylon. Between its opposite ends the piston 18 has an annular groove 20 that receives an annular sealing ring 22 that slidably but sealingly fits against the bore 16 of the casing 2. The piston 18 also has an axial section 24 that extends into the conical bore portion 4 and is provided with a central cavity 26. The cavity 26 has an abutment or end wall 28 remote from the jaw cluster; however the cavity 26 opens up at its opposite end to the jaw-cluster bore 14.

The larger end of each jaw 8 includes a T-shaped extension 30 that slidably fits into a correspondingly shaped slot 32 in the end portion of the piston section 24. The front extremity of the piston section 24 may also be cut away to provide notches 35 for receiving the ends 37 of the jaws. The engagement of the extension 30 with the respective slots 32 and the ends 37 with the notches 35 permits a certain amount of radial "float" in the jaws 8. Also, a limited amount of rocking movement of each jaw in the longitudinal direction is also permitted. The foregoing interengaging parts of the jaws and the piston allows the jaws to open up or close.

Also within the cylindrical portion 16 is a coil compression spring 34, one end of which bears against the piston 18 to bias the jaws in the direction of the opening 6, that is in the direction tending to restrict or close the jaw-cluster bore 14. The spring 34 is retained by a ring 36 having an aperture 38 therein. The ring 36 is peripherally clinched to the casing by the annular indentations or detents 40 shown. The spring 34 imposes some pre-load on the jaws but this is insufficient for gripping of the cable 42.

Since the splice is intended to grip not only an end of the cable 42 but an end of a like cable 42a, it will be apparent that parts within the right hand portion of the casing 2, only partially shown in FIG. 2, are identical to the parts previously described. That is, the right hand end of the casing houses jaws (not shown), a piston 18a, spring 34a, and spring retainer 36a with an opening 38a.

Intermediate the spaced-apart rings 38, 38a the wall of the casing 2 has a tube or fitting 44 at which fluid 45 (FIG. 5) such as hydraulic fluid, may be introduced into the cylindrical bore portion 16. This may be done by various conventional means, for example, by a threaded pipe 46 that threads into the fitting 44 and has an O-ring seal 48. The pipe 46 is connected to a suitable source of pressurized hydraulic fluid.

In use, the end of the cable 42 is manually inserted into the opening 6 through the jaw-cluster bore 14 and into the cavity 26 until the end of the cable engages the abutment 28. A like procedure is followed with respect to the cable 42a. As each cable is installed, the respective springs 34, 34a will compress, allowing the jaws to move axially as clusters and radially as well, so that the jaw cluster bores open up to receive the cables. When the cables are released, the forces of the springs 34, 34a cause the teeth of the jaws to impose a mild pressure on the respective cables. Thereafter, the fluid 45 is introduced through the pipe 46, as indicated by the heavy arrows in FIG. 5, and into the chamber between the pistons 18, 18a. The apertures 38, 38a permit passage of the fluid to the pistons. Sufficient hydraulic pressure is applied to the pistons 18, 18a to bias them toward their associated cable-receiving openings 6, 6a so that the teeth of the jaw-clusters bite into and are permanently set in the respective cables 42, 42a. The areas of the pistons acted upon by the fluid pressure and the tapers of the casing and the jaws are such that it is not necessary to keep the pistons pressurized in order to insure that the jaw-clusters remain in gripping engagement with the respective cables. Thus, an effective and permanent mechanical and electrical connection between the cables is formed which is maintained without the cables being under tension.

The invention is claimed as follows:

1. A fluid-pressure operated splice for an electrically conductive cable comprising a casing having a bore with a conical bore portion terminating at its smaller diameter end in a cable-receiving opening of the casing, a plurality of jaws in said conical bore portion, each jaw being axially tapered in the direction of said cable-receiving opening and said jaws circumferentially disposed to provide a generally tubular jaw-cluster, said jaws having recesses that cooperate to provide a jaw-cluster bore substantially coaxial with said casing bore and with said recesses having teeth exposed at said jaw-cluster bore, said casing bore having a cylindrical bore portion adjacent to the larger diameter end of said conical bore portion, a piston slidable in said cylindrical bore portion, means joining said jaws and said piston, said piston having a central cavity communicating with said jaw-cluster bore for receiving a cable inserted through said cable-receiving opening and through said jaw-cluster bore, spring means in said casing imposing a pre-load on said jaws in the direction of said cable-receiving opening to engage the cable, which pre-load is insufficient for effective gripping of the cable by a permanent set therein, and said casing having an opening for receiving fluid under pressure in said cylindrical bore portion, said bore portion being constructed to hold fluid under pressure so as to impose fluid pressure on said piston in the direction of said cable-receiving opening sufficient so that the pressure on the piston urges the teeth of the jaw-cluster into biting engagement with the cable to form form a permanent set thereon, the area of the piston acted upon by said fluid pressure and the tapers of said casing and jaws being such that the jaws remain in permanent gripping engagement with the cable upon release of said fluid pressure.

2. A fluid-pressure operated splice according to claim 1 in which said piston has an end portion, said end portion and said jaws having interengaging parts constituting said means for joining said jaws and said piston.

3. A fluid-pressure operated splice according to claim 1 in which said cavity has an end wall constituting an abutment for an end of said cable.

* * * * *